United States Patent [19]

Schroeder, Jr. et al.

[11] 3,964,548

[45] June 22, 1976

[54] METHOD FOR OIL RECOVERY BY FLOODING WITH MICELLAR DISPERSIONS CONTAINING CRUDE OIL SULFONATES

[75] Inventors: Donald E. Schroeder, Jr.; Mark A. Plummer; Wayne O. Roszelle, all of Littleton, Colo.

[73] Assignee: Marathon Oil Company, Findlay, Ohio

[22] Filed: Mar. 27, 1975

[21] Appl. No.: 562,520

[52] U.S. Cl. .............................. 166/273; 166/275; 252/8.55 D
[51] Int. Cl.² ........................................ E21B 43/22
[58] Field of Search ........ 166/273, 274, 275, 305 R; 252/8.55 D

[56] References Cited
UNITED STATES PATENTS

| | | | |
|---|---|---|---|
| 3,302,713 | 2/1967 | Ahearn et al. | 166/275 X |
| 3,480,080 | 11/1969 | Murphy | 166/274 X |
| 3,497,006 | 2/1970 | Jones et al. | 166/273 |
| 3,504,744 | 4/1970 | Davis, Jr. et al. | 166/275 X |
| 3,508,611 | 4/1970 | Davis, Jr. et al. | 166/275 X |
| 3,613,786 | 10/1971 | Jones et al. | 166/275 X |
| 3,740,343 | 6/1973 | Jones et al. | 166/275 X |
| 3,827,496 | 8/1974 | Schroeder | 166/274 X |

*Primary Examiner*—Stephen J. Novosad
*Assistant Examiner*—George A. Suckfield
*Attorney, Agent, or Firm*—Joseph C. Herring; Jack L. Hummel

[57] ABSTRACT

Improved oil recovery by flooding subterranean formations with micellar dispersions; comprised of hydrocarbon, water, cosurfactant, electrolyte, and petroleum sulfonate obtained by sulfonating whole or topped crude oil; is obtained by incorporating within the micellar dispersion about 1.5 to about 4.5 wt. % of active sulfonate groups (e.g. $-SO_3NH_4$ or $-SO_3Na$) which are attached to the petroleum sulfonate. The micellar dispersions of this invention contain an amount of cosurfactant in excess of the amount required to produce a viscosity maximum with the particular micellar dispersion.

19 Claims, 3 Drawing Figures

OIL RECOVERY VS wt. % of -SO₃NH₄ IN MICELLAR DISPERSION

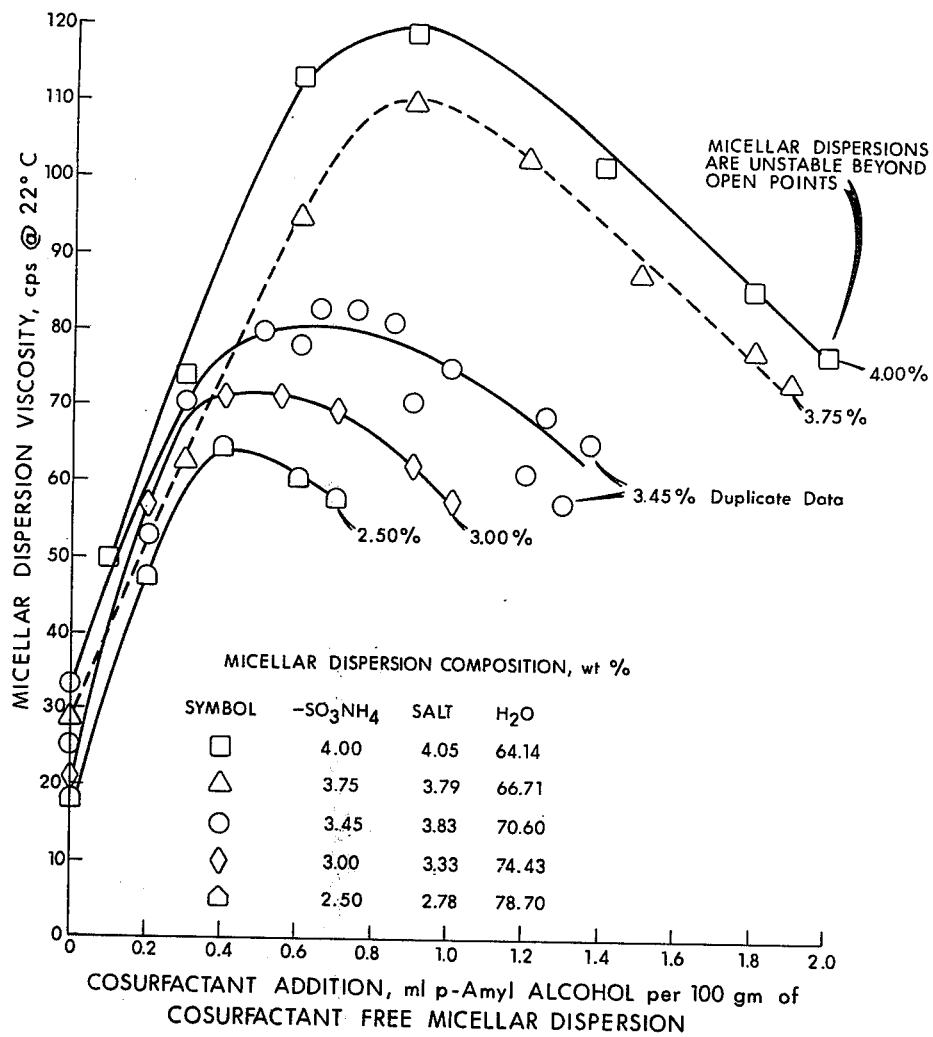

METHOD FOR OIL RECOVERY BY FLOODING WITH MICELLAR DISPERSIONS CONTAINING CRUDE OIL SULFONATES

BACKGROUND OF THE INVENTION

1. Field of the Invention

This invention relates to injecting a micellar dispersion into a subterranean formation and displacing it toward a production means in fluid communication with the formation to recover crude oil therethrough.

2. Description of the Prior Art

Micellar dispersions are useful for recovering crude oil from subterranean reservoirs, e.g. U.S. Pat. Nos. 3,254,714; 3,275,075; 3,506,070; 3,497,006; 3,613,786; 3,734,185; 3,740,343; 3,827,496; and other patents defining surfactant systems and assigned to Esso Production Research Company, Shell Oil Company, and Union Oil Company, etc. The micellar dispersion can be water-external or oil-external. The prior art generally teaches that the micellar dispersion is injected into the oil-bearing formation followed by a mobility control buffer and these displaced by a water drive. The micellar dispersion is displaced toward a production means from which crude oil is recovered. In general, the above patents teach that surfactant useful in the micellar dispersion can be petroleum sulfonate obtained from gas oils; or other fraction of crude oil. Much of the prior art relating to sulfonation to produce petroleum sulfonates describes processes wherein the petroleum sulfonate produced is a by-product of the polishing of lubricating stock. Different processes are needed to produce the different types of petroleum sulfonates needed for widespread effective and economic oil recovery. Processes such as those in copending U.S. Pat. Ser. Nos. 513,692, now U.S. Pat. No. 3,912,327, 376,657 teach processes wherein whole or topped crude oil are sulfonated to obtain sulfonates useful in crude oil recovery. The micellar dispersions using these new types of petroleum sulfonates contain cosurfactants. In the processes of our applications, whole or topped crude is sulfonated with sulfur trioxide and the sulfonic acids neutralized with a monovalent base to obtain the desired sulfonate, and unreacted hydrocarbon can be removed either before or after neutralization.

The prior art generally teaches that improved oil recoveries are obtained where the petroleum sulfonate is present in concentrations above the CMC (critical micelle concentration) level. Also, the prior art teaches that in order to obtain good oil recoveries with sulfonates obtained from gas oils, the sulfonate concentration should be present in concentrations of at least 4% (this concentration level can include unreacted vehicle oil within the petroleum sulfonate; thus, the concentration of $-SO_3NH_4$ groups within a micellar dispersion can be considerably less than 1 wt. %). For example, U.S. Pat. No. 3,734,185 teaches that the minimum, ammonium petroleum sulfonate within the micellar dispersion can be 2.4% (this equals about 0.6 weight percent of $-SO_3NH_4$ groups). In general, the prior art teaches that the sulfonate groups within the micellar dispersion can be less than 0.5 and more likely less than 0.25 for diluted surfactant systems.

SUMMARY OF THE INVENTION

Applicants have discovered that micellar dispersions containing hydrocarbon, water, cosurfactant, electrolyte and petroleum sulfonates obtained from whole or topped crude oil obtain improved recovery providing the micellar dispersion contains in excess of the amount of cosurfactant needed to give the resulting micellar dispersion a maximum viscosity and also contains from about 1.5 to about 4.5 wt. % of active sulfonate groups within the micellar dispersion.

BRIEF DESCRIPTION OF THE DRAWING

FIG. 3 shows curves representing the micellar dispersion viscosities in cp at 22°C. vs. the cosurfactant titration with p-amyl alcohol. Each of the curves represent different concentrations of the sulfonate groups within the micellar dispersions. The micellar dispersion compositions are defined in FIG. 3.

PREFERRED EMBODIMENTS OF THE INVENTION

Figure 1:
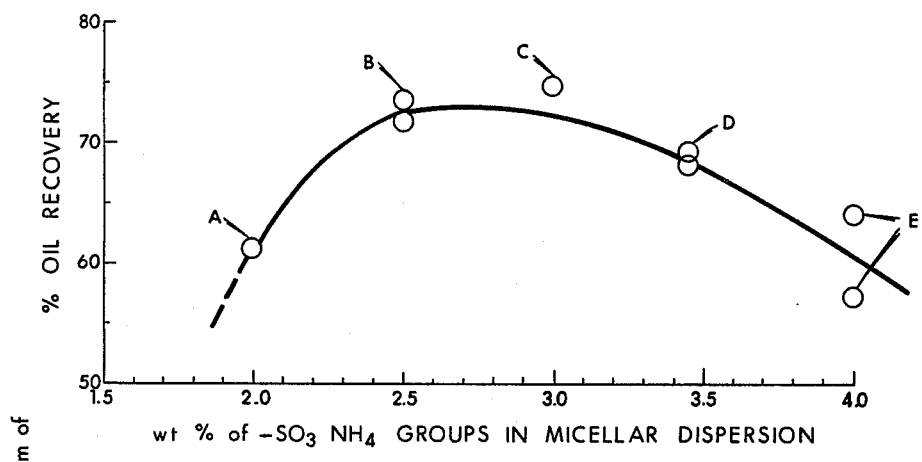
FIG. 1 represents the percent oil recovery vs. the weight percent of $-SO_3NH_4$ groups in the micellar dispersion. As this curve indicates, oil recovery is dependent upon the concentration of the sulfonate groups. Data for this curve was obtained under similar flooding conditions and are indicated in Table 1.
Figure 2:
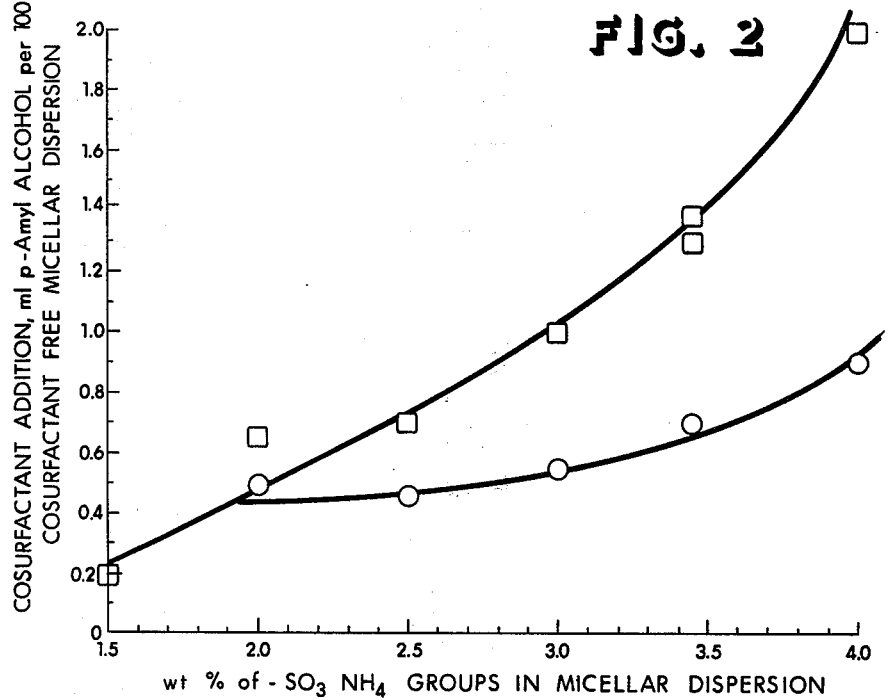
FIG. 2 represents the cosurfactant (p-amyl alcohol) range for each of the micellar dispersions flooded in FIG. 1. The bottom curve is a locus of the maximum slug viscosities and the upper curve represents the instability points of the dispersions. Thus, between the bottom and the top curves lie the cosurfactant range for each of the micellar dispersions and the stability region on the "right side" of the maximum viscosity peak.

The term "micellar dispersion" as used herein is meant to include microemulsions and micellar systems containing lamellar micelles. These systems can be oil-external or water-external, they can act like they are either oil-external or water-external or both and they can also be in an "intermediate" region between a "classicaly" oil-external micellar system and a "classically" water-external micellar system. However, all of the systems, regardless of the externality properties, are thermodynamically stable and optically clear; however, color bodies within the different components can prevent the transmission of light. For simplicity, the micellar systems are herein defined as micellar dispersions.

The micellar dispersions are composed of hydrocarbon, water, petroleum sulfonate, cosurfactant, and electrolyte. Additional component(s) can be added if desirable. However, these components must be compatible with the other components of the micellar dispersion and not impart adverse properties to the system.

Examples of the components useful with the micellar dispersion are defined in the prior art; for example, those components taught in the above-indicated patent numbers of the "prior art". The petroleum sulfonate is obtained by sulfonating whole or topped crude oil with preferably sulfur trioxide and thereafter neutralized with a monovalent base, preferably ammonium or sodium. The petroleum sulfonate can optionally be extracted either before or after neutralization to remove component(s). Diluents can be used during the sulfonation process to enhance reaction conditions. Also, components can be added to the sulfonation process to obtain enhanced oil recovery or to give improved processing conditions. Examples of processes to obtain the petroleum sulfonates are taught in U.S. Ser. No.

430,963, titled "Sulfonation of Crude Oils with Gaseous $SO_3$ to Produce Petroleum Sulfonates", filed Jan. 4, 1974 and Ser. No. 513,674, titled "Sulfonation of Crude Oils to Produce Petroleum Sulfonates", filed Oct. 10, 1974. Process technology within the prior art is intended to be incorporated within the scope of this invention to obtain the petroleum sulfonates.

The hydrocarbon is typically crude oil, a fraction thereof, unreacted vehicle oil within the petroleum sulfonate, synthesized hydrocarbon, mixtures thereof or like materials.

The water can be distilled water, fresh water, or water containing a moderate amount of salts. Typically, the water contains about 5 to about 50,000 TDS (total dissolved solids). Preferably, the water does not contain multivalent cations which will displace the monovalent cations on the petroleum sulfonate.

The electrolytes are water-soluble and can be inorganic salts, inorganic bases, inorganic acids or mixtures thereof. Typically, the salts are reaction by-products from the sulfonation reaction such as ammonium sulfate, ammonium sulfite, sodium sulfate, sodium sulfite, etc.

The cosurfactant is also known as a semi-polar organic compound, a cosolubilizer, etc. Examples of cosurfactants include organic compounds containing 1 to about 25 or more carbon atoms, and more preferably 3 to about 16 carbon atoms, which can be alcohol, amide, amino compound, ester, aldehyde, ketone, complexes thereof, or a compound containing one or more of amido, hydroxy, bromo, chloro, carbonato, mercapto, oxo, oxy, carbonyl, or like groups or mixtures thereof. Specific examples include isopropanol, butanol, amyl alcohol, hexanols, octanols, decylalcohols, alkarylalcohols, such as n-nonylphenol and p-nonylphenol, 2-butoxyhexanol, alcoholic liquors such as fusel oil, ethoxylated alcohols such as alcohols containing 4 to 16 carbon atoms that are ethoxylated and optionally sulfated, hydrogenated hydrocarbons such as hydrogenated croton oil, amidized hydrocarbons, and like materials. The preferred cosurfactant is an alcohol and it can be a primary, secondary or tertiary alcohol or mixture thereof and can optionally be ethoxylated and/or sulfated.

Concentration of the components within the micellar dispersion vary depending upon the particular component and the particular properties desired of the micellar dispersion. Typically the concentrations can be about 1 to about 90%, preferably about 2 to about 40%, more preferably about 4 to about 20% and most preferably about 5 to about 15% of hydrocarbon; 10 to about 95 and preferably about 50 to about 85% and more preferably about 60 to about 80% of water; about 1.5 to about 4.5 and preferably about 1.75 to about 4.25 and more preferably about 2 to about 4.0% and most preferably about 2.5 to about 3.5% of active sulfonate groups, e.g. $-SO_3NH_4$, $-SO_3Na$, on the petroleum sulfonate molecule; about 0.01 to about 20% and preferably about 0.1 to about 7.5% and more preferably about 0.2 to about 5% of the cosurfactant; and about 0.001 to about 10% and preferably about 0.5 to about 5% of electrolyte.

The micellar dispersion can be injected into the formation in volume amounts of less than 1 to about 50% or more and preferably about 4 to about 15% FPV (formation pore volume). This is preferably followed by a mobility buffer, preferably an aqueous solution containing a water-soluble polymer that will impart permeability reduction to the formation and/or viscosity increasing properties to the aqueous solution---examples of volume amounts include about 10% to 200% FPV or more and preferably about 50 to about 150% FPV and more preferably about 70% to about 100% FPV (formation pore volume). A water drive is injected to displace the micellar dispersion and the mobility buffer toward a production well in fluid communication with the formation to recover crude oil through the production well. The water drive should be compatible with the other components of the process as well as the subterranean formation.

To determine desired cosurfactant concentration, the micellar dispersions are titrated with a cosurfactant to go through a viscosity maximum. That is, upon titration, the viscosity increases until a maximum is obtained and thereafter the viscosity decreases. The micellar dispersions of this invention are those that are on the "right side" of the viscosity maximum on a graph. After the micellar dispersion goes through the viscosity maximum, the cosurfactant titration is continued until the desired viscosity is obtained for flooding a particular formation. The desired viscosity will depend upon the combined mobility of the hydrocarbon and water within the formation to be flooded, the design mobility of the mobility buffer, the "life" of the flooding project, and in general the overall design mobility and desired "pay-out" and economics of the flooding project. For a given micellar dispersion, titration of the dispersion to a given viscosity on the left side of the viscosity maximum will obtain less oil recovery than an identical viscosity on the right side of the viscosity maximum. That is, optimum oil recovery is obtained with cosurfactant additions greater than that yielding the maximum micellar dispersion viscosity.

Generally speaking, the viscosity of the micellar dispersion at reservoir temperature is desirably greater than the combined reciprocal mobility of the formation fluids, i.e. hydrocarbon, gas, and water, within the formation.

Improved oil recoveries with these micellar dispersions are obtained where the sulfonate groups, e.g. $-SO_3Na$, $-SO_3NH_4$, are within the previously indicated ranges. At higher sulfonate group concentrations, tertiary oil recovery generally decreases, however, this may be due to the higher viscosity of the micellar dispersion. At the lower sulfonate group concentration, the stability region on the "right side" of the viscosity maximum is very narrow or nonexistent and thus micellar dispersions obtained from crude oil sulfonates may be unstable. However, it is known that micellar dispersions obtained from crude oil sulfonates having sulfonate group concentrations less than that specified herein, generally obtain less than optimum oil recovery. This is illustrated in FIG. 1.

Working Examples:

The following examples are presented to teach specific embodiments of the invention. Unless otherwise specified, all percents are based on weight.

EXAMPLE I

Reservoir disc cores, 2 inches thick and 6 inches in diameter, taken from a Henry unit of Crawford County, Illinois, U.S.A., are prepared in a tertiary condition by first flooding the cores with a solvent to remove any liquid therein; then drying them in a vacuum at 50°C. and thereafter saturating the cores with water containing 8,000 ppm of TDS. The cores are then flooded with crude oil having a viscosity of 7 cp at 22°C. to residual water saturation and are thereafter flooded with water containing 8,000 ppm of TDS to residual oil saturation. The cores are now in a tertiary condition. The cores are flooded with the micellar dispersion indicated in Table 1; the micellar dispersions are made up with a petroleum sulfonate obtained by sulfonating whole crude oil, 36° API, with gaseous $SO_3$ at a treat level of 9.61 lbs. of $SO_3$/100 lbs. crude oil feedstock. The sulfonic acids are neutralized with ammonia to obtain the ammonium petroleum sulfonates. The permeabilities and porosities of the core samples are indicated in Table 1 as well as the percent oil recovery. In each case, the micellar dispersions are followed by an aqueous mobility buffer which is 10% FPV of water containing 1100 ppm of Dow Pusher Polymer 700 (a high molecular weight, partially hydrolyzed polyacrylamide marketed by Dow Chemical Co., U.S.A. under the trademark "Pusher"), 53% FPV of an aqueous solution containing 615 ppm of Dow Pusher Polymer 700, and 30% FPV of an aqueous solution containing 117 ppm of Dow Pusher Polymer 700—the water used contains 400 ppm of TDS. Thereafter, 50% FPV of water containing 8000 ppm of TDS is injected to displace the micellar dispersions and mobility buffers through the cores.

taining 8000 ppm of TDS is injected. Oil recovery data are presented in Table 2:

TABLE 2

| Oil Recovery Data | Micellar Dispersion F |
|---|---|
| Slug Size, % PV | 15.0 |
| Flooding Rate, ft/day | 0.286/0.279 |
| Permeability of core, md | 65/96 |
| Porosity of core | 21.6/22.2 |
| Residual Oil, in core | 29.3/26.0 |
| % Recovery, OIP | 19.8/19.8 |
| % Recovery, at 40% $S_{or}$ | 41.3/47.8 |

It is not intended that the above examples limit the invention. Rather, it is intended that all equivalents obvious to those skilled in the art be incorporated within the scope of the invention as defined within the specification and appended claims.

What is claimed is:

1. In a process for recovering hydrocarbon from a subterranean formation having at least one injection means in fluid communication with at least one production means and wherein a micellar dispersion comprised of water, hydrocarbon, cosurfactant, electrolyte, and petroleum sulfonate obtained by sulfonating whole

TABLE 1

EFFECT OF -$SO_3NH_4$ CONCENTRATION ON MICELLAR DISPERSION PROPERTIES

| Micellar Dispersion | A | B | C | D | E |
|---|---|---|---|---|---|
| Composition, wt. % | | | | | |
| -$SO_3NH_4$ | 2.00 | 2.50 | 3.00 | 3.45 | 4.00[1] |
| Salt | 1.94 | 2.78 | 3.33 | 3.83 | 4.05 |
| $H_2O$ | 83.43 | 78.70 | 74.43 | 70.60 | 62.14 |
| Viscosity Data | | | | | |
| Initial Vis. at 22°C. | 6.5 | 18.2 | 21.0 | 33.5 | 50.2 at 0.1 |
| Cosurfactant | PAA | PAA | PAA | PAA | PAA |
| Maximum Viscosity | 38.4 | 64.7 | 71.2 | 83.1 | 119.0 |
| at ml/100 g | 0.5 | 0.45 | 0.55 | 0.7 | 0.9 |
| Instability | 0.7 | 0.7 | 1.1 | 1.3 | 2.0 |
| Micellar Dispersion | | | | | |
| Make-Up | | | | | |
| Cosurfactant | | | | | |
| (p-amyl alcohol) | | | | | |
| ml/100 g. | 0.6 | 0.50 | 0.80 | 1.00 | 1.40 |
| Viscosity | 37.3 | 62.3 | 68.5 | 71.4 | 79.0 |
| Oil Recovery Data | | | | | |
| Slug Size, % PV | 12.50 | 9.66 | 8.05 | 7.00 | 7.00 |
| Flooding Rate, ft/day | 0.263 | 0.297/0.298 | 0.301 | 0.281/0.275 | 0.288/0.293 |
| Permeability of core, md | 69 | 227/160 | 192 | 140/134 | 101/38 |
| Porosity of core | 21.6 | 23.1/23.4 | 23.0 | 21.3/22.6 | 21.6/19.9 |
| Residual oil, in core | 30.5 | 42.4/41/8 | 42.4 | 36.5/35.6 | 37.6/39.5 |
| % Recovery, OIP | 49.0 | 74.9/73.2 | 76.2 | 66.1/64.7 | 54.4/63.6 |
| % Recovery at 40% $S_{or}$[2] | 61.1 | 73.4/72.0 | 74.8 | 69.1/68.6 | 57.2/64.1 |

[1]3 vol % alkylate was added to this slug to reduce the viscosity and alcohol requirement.
[2]Corrected to an initial oil saturation in the core of 40%.
OIP = oil in place
PAA = p-amyl alcohol

EXAMPLE II

To show the criticality of the lower range of —$SO_3NH_4$ concentration, two runs with identical micellar dispersions are made under conditions similar to those defined in Example 1. The dispersion contains 1.67% —$SO_3NH_4$, 1.7% salt, 88.1% water, and 0.3 ml of n-pentanol/100 gms of alcohol free dispersion. 15.0% FPV of the dispersion is injected into disc cores followed by 10% FPV of an aqueous mobility buffer containing 656 ppm of Dow Pusher Polymer 700, followed by 45% FPV of an aqueous mobility buffer containing 328 ppm of Dow Pusher Polymer 700, followed by 30% FPV of an aqueous mobility buffer containing 50 ppm of Dow Pusher Polymer 700—the water contains 400 of TDS. Thereafter, 50% FPV of water conor topped crude oil is injected into the formation and displaced toward the production means to recover therethrough and wherein the cosurfactant concentration is present in excess of that concentration required to produce in the micellar dispersion a viscosity maximum, the improvement comprising incorporating within the micellar dispersion about 1.5 to about 4.5 weight percent of active sulfonate groups which are attached to the petroleum sulfonate within the micellar dispersion and thereafter injecting the micellar dispersion into the formation.

2. The process of claim 1 wherein the concentration of the active sulfonate groups is about 1.75 to about 4.25% and the active sulfonate groups are -$SO_3NH_4$.

3. The process of claim 1 wherein the concentration of the active sulfonate groups is about 1.75 to about 4.25% and the active sulfonate groups are -$SO_3Na$.

4. The process of claim 1 wherein the concentration of the active sulfonate groups is about 2 to about 4% and the active sulfonate group is -$SO_3NH_4$.

5. The process of claim 1 wherein the concentration of the active sulfonate groups is about 2 to about 4% and the active sulfonate group is $SO_3Na$.

6. The process of claim 1 wherein the micellar dispersion contains about 2.5 to about 3.5% —$SO_3NH_4$ groups.

7. The process of claim 1 wherein the micellar dispersion contains about 2.5 to about 3.5% —$SO_3Na$ groups.

8. The process of claim 1 wherein the micellar dispersion contains about 10 to about 95% water, about 1 to about 90% hydrocarbon, about 0.01 to about 20% cosurfactant, about 1.5 to about 4.5% of -$SO_3NH_4$ groups, and about 0.001 to about 10% electrolyte, the percents based on weight.

9. The process of claim 1 wherein the micellar dispersion contains about 10 to about 95% water, about 1 to about 90% hydrocarbon, about 0.01 to about 20% cosurfactant, about 1.5 to about 4.5% of -$SO_3Na$ groups, and about 0.001 to about 10% electrolyte, the percents based on weight.

10. The process of claim 1 wherein the micellar dispersion contains about 60 to about 80% water, about 4 to about 20% hydrocarbon, about 0.2 to about 5% cosurfactant, about 0.5 to about 5% electrolyte, and about 2.0 to about 4% -$SO_3NH_4$, the percents based on weight.

11. The process of claim 1 wherein the micellar dispersion is followed by a mobility buffer and the mobility buffer is followed by a water drive.

12. The process of claim 1 wherein the hydrocarbon concentration is about 5 to about 15% by weight and the -$SO_3NH_4$ concentration is about 2 to about 4% by weight.

13. The process of claim 1 wherein the hydrocarbon is comprised of unreacted hydrocarbon within the petroleum sulfonate.

14. In a process for recovering hydrocarbon from a subterranean formation having at least one injection means in fluid communication with at least one production means and wherein a micellar dispersion comprised of about 50 to about 85% water, about 2 to about 40% hydrocarbon which is comprised of unreacted hydrocarbon within the petroleum sulfonate, about 0.1 to about 7.5% cosurfactant, about 0.5 to about 5% salt, and a petroleum sulfonate obtained by sulfonating whole or topped crude oil, followed by an aqueous mobility buffer and then a water drive is injected into the formation and displaced toward the production means to recover the hydrocarbon therethrough and wherein the cosurfactant is present in concentrations in excess of those required to give the micellar dispersion a viscosity maximum, the improvement comprising incorporating about 2 to about 4 weight percent of -$SO_3NH_4$ groups on the petroleum sulfonate into the micellar dispersion to obtain the optimum oil recovery, the percents based on weight.

15. The process of claim 14 wherein the micellar dispersion contains about 4 to about 20% hydrocarbon.

16. The process of claim 14 wherein the concentration of the -$SO_3NH_4$ groups on the ammonium petroleum sulfonates is about 2.5 to about 3.5%.

17. The process of claim 14 wherein the micellar dispersion contains about 60 to about 80% water.

18. The process of claim 14 wherein the micellar dispersion contains about 5 to about 15% hydrocarbon.

19. The process of claim 14 wherein the improvement comprises incorporating about 2 to about 4 wt. % of —$SO_3Na$ groups on the petroleum sulfonate into the micellar dispersion to obtain the optimum oil recovery, the percents based on weight.

* * * * *

UNITED STATES PATENT AND TRADEMARK OFFICE
CERTIFICATE OF CORRECTION

PATENT NO. : 3,964,548
DATED : June 22, 1976
INVENTOR(S) : Donald E. Schroeder, Jr. et al It is certified that error appears in the above-identified patent and that said Letters Patent are hereby corrected as shown below:

Col. 6, line 56:   Insert --hydrocarbon-- after "recover"

Signed and Sealed this

Eighteenth Day of August 1981

[SEAL]

Attest:

GERALD J. MOSSINGHOFF

Attesting Officer   Commissioner of Patents and Trademarks